US011180394B2

(12) United States Patent
Yan et al.

(10) Patent No.: US 11,180,394 B2
(45) Date of Patent: Nov. 23, 2021

(54) OPTIMALLY-CONTROLLED HYBRID PHYTOREMEDIATION SYSTEM

(71) Applicant: UCHICAGO ARGONNE, LLC, Chicago, IL (US)

(72) Inventors: Y. Eugene Yan, Naperville, IL (US); Louis E. Martino, Clarksville, MD (US); Lorraine M. LaFreniere, Joliet, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 16/588,154

(22) Filed: Sep. 30, 2019

(65) Prior Publication Data
US 2021/0094853 A1 Apr. 1, 2021

(51) Int. Cl.
| C02F 3/32 | (2006.01) |
| B09C 1/08 | (2006.01) |
| B09C 1/00 | (2006.01) |
| B09C 1/10 | (2006.01) |
| C02F 103/06 | (2006.01) |

(52) U.S. Cl.
CPC ............. *C02F 3/32* (2013.01); *B09C 1/002* (2013.01); *B09C 1/08* (2013.01); *B09C 1/105* (2013.01); *C02F 2103/06* (2013.01)

(58) Field of Classification Search
CPC .......... C02F 3/32; C02F 2103/06; B09C 1/08; B09C 1/105; B09C 1/002
USPC ............. 210/602, 614, 747.7, 747.8, 170.07
See application file for complete search history.

(56) References Cited

U.S. PATENT DOCUMENTS

| 4,839,051 A | * | 6/1989 | Higa | C02F 3/046 210/170.07 |
| 5,829,191 A | | 11/1998 | Gatliff | |
| 5,829,192 A | | 11/1998 | Gatliff | |
| 5,893,975 A | * | 4/1999 | Eifert | C02F 3/327 210/602 |
| 6,067,752 A | * | 5/2000 | Bryan | A01G 13/10 47/47 |
| 6,189,262 B1 | * | 2/2001 | Gatliff | B09C 1/105 47/58.1 R |
| 6,205,708 B1 | | 3/2001 | Gatliff | |

(Continued)

*Primary Examiner* — Fred Prince
(74) *Attorney, Agent, or Firm* — Cherskov Flaynik & Gurda, LLC

(57) ABSTRACT

A method for treating chemicals below ground is provided. The system includes contacting the chemicals with a rhizosphere to maximize transpiration rate and minimize oversaturation of the rhizosphere. Also provided is a method for using contaminated groundwater as a sole source of irrigation. The method uses extracting the contaminated water and pumping the extracted water to an irrigation zone under the control of an autonomous irrigation system. Each zone includes some trees and the root system for each tree is modified to function as a treatment cell. The invention also provides a system for treating contaminated water, using a contaminated water source situated below ground surface. The system uses a pump for extracting contaminated water from the water source and prevents the contaminated water from directly contacting the atmosphere above the ground surface. Vegetation which defines an underground rhizosphere is adapted to directly receive the water.

22 Claims, 3 Drawing Sheets

(56) References Cited

U.S. PATENT DOCUMENTS

| | | | | |
|---|---|---|---|---|
| 6,250,237 B1* | 6/2001 | Licht | ................... | B09C 1/002 |
| | | | | 111/200 |
| 6,555,001 B1* | 4/2003 | Crossman | ............... | B09C 1/002 |
| | | | | 111/118 |
| 8,696,907 B2* | 4/2014 | Rausch | ................... | C02F 3/327 |
| | | | | 210/602 |
| 8,894,849 B1* | 11/2014 | Shelley | ................... | C02F 3/327 |
| | | | | 210/150 |
| 2003/0070989 A1* | 4/2003 | MacQuoid | ............... | B01J 20/24 |
| | | | | 210/660 |
| 2005/0045556 A1* | 3/2005 | Kryzak | .................... | B09C 1/08 |
| | | | | 210/602 |
| 2007/0101461 A1* | 5/2007 | Van Der Lelie | ......... | A01H 3/00 |
| | | | | 800/295 |

\* cited by examiner

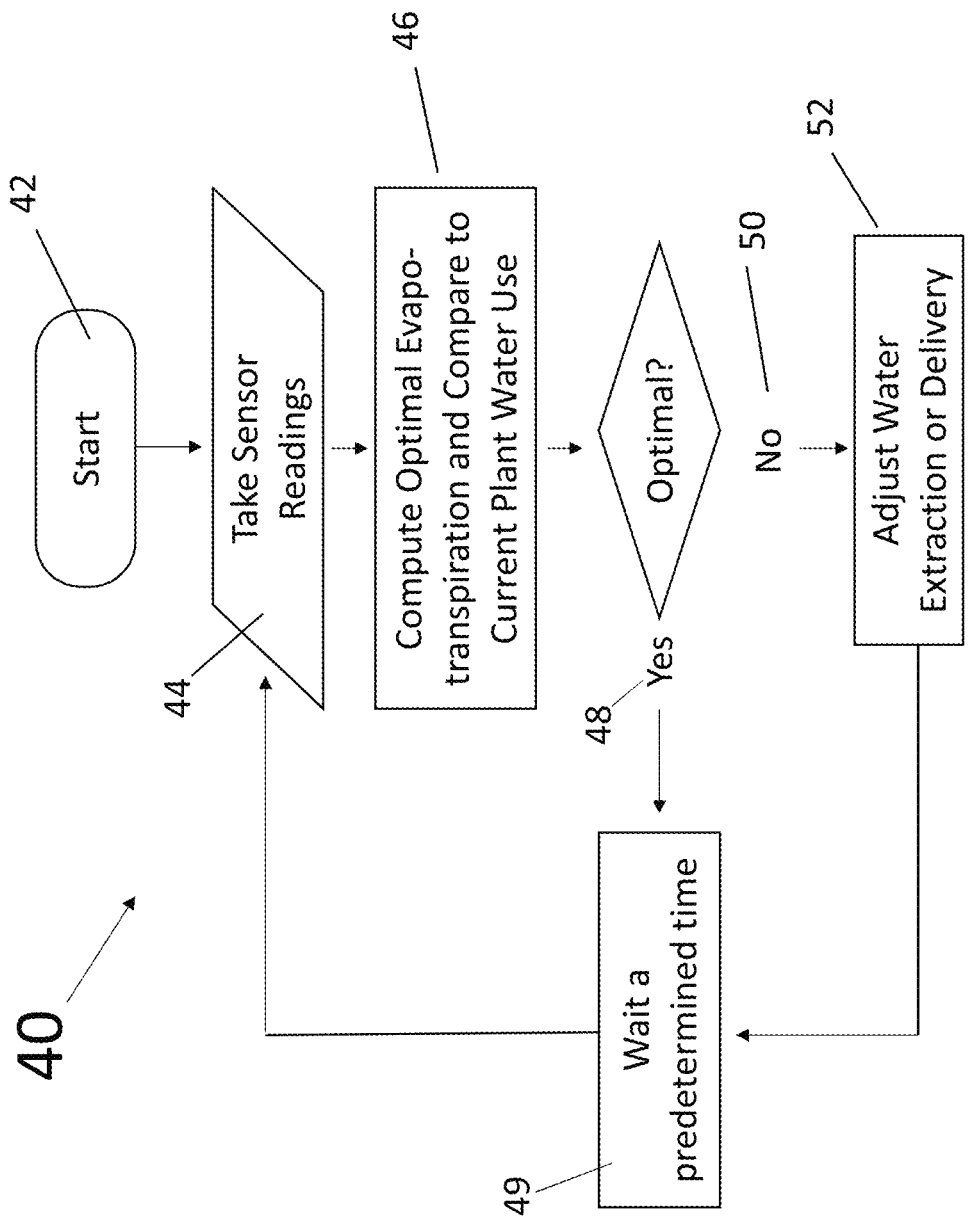

OPTIMALLY-CONTROLLED HYBRID PHYTOREMEDIATION SYSTEM

CONTRACTUAL ORIGIN OF THE INVENTION

This invention was made with government support under Contract No. DE-AC2-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to a method and system for phytoremediation and more specifically, this invention relates to a system and method for utilizing sensor-based controllers to optimize deliverability of contaminated groundwater and contamination uptake/removal/treatment by plants.

2. Background of the Invention

Sites with contaminated soil and groundwater are treated in a myriad of ways. Conventional technology utilizes in-situ chemical and biologic treatments injected into the subsurface, or physical containment, or physical removal with or ex-situ treatment. Physical removal steps include extraction, treatment, disposal of treatment residuals, and the discharge of treated effluent to surface water. Depending on the contaminants or mixture of multiple contaminants, these manmade ex situ treatments can include myriad treatment approaches such as pH control, flocculation/precipitation, turbidity control, cation exchange, anion exchange, reverse osmosis and air stripping. Such conventional systems require multiple treatment systems (e.g., the technology train enumerated supra). Oftentimes these systems have low effectiveness due to chemical interference, despite their high construction and operations and maintenance (O&M) costs.

Less conventional technologies include phytoremediation. Processes that occur during phytoremediation include the following:
- Phytosequestration-sequestration of contaminants in the rhizosphere. (The rhizophere is the region of soil in the vicinity of plant roots. The chemistry and microbiology of the soil is influenced by root growth, respiration and nutrient exchange.)
- Rhizodegradation-biodegradation of contaminants in the rhizosphere.
- Phytohydraulics-capture and evapotranspiration of water.
- Phytoextraction-capture and evapotranspiration of contaminants.
- Phytovolatilization-transpiration of volatile contaminants taken up by the plant.

Phytoremediation processes often can supplant the conventional, more complex technology train systems. Several factors have a strong influence on the efficacy of phytoremediation approaches, including: land use constrictions, contaminant type, contaminant concentration, contaminant depth, soil type, and climate. To some extent, soil type and climate can be engineered with irrigation approaches, soil additives, and planting techniques. Addressing contaminant-specific issues (type, combination of multiple types, concentration, depth, location and extent) is more problematic. The maximum depth of contamination that can be targeted is generally 25 ft below ground surface (bgs). To achieve this rooting depth, specialized planting techniques are often necessary to extend root growth. Deep-rooting phreatophytes such as poplar and willow species or hybrids can be used very effectively. These candidate species are planted in specially constructed borings with modifications such as aeration tubes to mimic the natural atmospheric condition of a near surface rhizosphere. In addition, a design to force the specially planted trees to use water from the targeted remediation zone in lieu of using near-surface groundwater must be maintained. A drawback to this approach is that plants with forced deep-rooting system may often suffer from instability and unhealthy growth due to change in water level of near-surface groundwater and lack of broad shallow roots to support.

Contaminant cleanup is often confounded by the presence of more than one target moiety or contaminant of concern (COC). For example, while carbon tetrachloride ($CCl_4$) (a once widely component in fumigant for gain preservation) may be a primary target, nitrates from fertilizers used to grow the crop also may be present.

Nitrate contamination in groundwater is problematic throughout the United States, impacting both public water supply systems and privately owned water supply wells. The contamination is so widespread and serious it has been called "Rural America's Own Private Flint," a reference to the water supply issues that came to light in Flint, Mich. Nitrates are cited here as one target moiety. Other COC's can also be present.

COCs can be categorized into contaminant groups as follows:
Nonhalogenated volatile organic compounds (VOCs),
Halogenated VOCs,
Nonhalogenated semi-volatile organic compounds (SVOCs),
Halogenated SVOCs,
Nonvolatile organic compounds including per- and polyfluoroalkyl substance (PFAS)
Fuels,
Inorganics,
Radionuclides, and
Explosives (FRTR 2002).

A treatment technology may be well suited to treat one or several of the contaminant groups. However, typically no single technology can address all of the contaminant groups noted.

Often, technologies suitable for treating halogenated volatile organic carbons (e.g. $CCl_4$) cannot also be used to treat inorganic contaminants (e.g., nitrates). Addressing COCs in both the halogenated VOC and inorganics contaminant groups requires combining treatment technologies to achieve remedial action goals such as a desired clean up concentration threshold in groundwater or a performance threshold such as the amount of COC removal over time.

Phytoremediation has received much attention due to its ability to use multiple natural contaminant removal mechanisms with significant benefits over conventional in situ and ex situ treatment systems that include ecological enhancement, aesthetic value, low O&M costs (because the systems are self-sustaining), and both public and regulatory approval. However, as noted supra, phytoremediation suffers several limitations: (1) contaminated groundwater usually exceeds the 25 feet (ft) bgs threshold for effective vertical tree root growth; (2) natural evapotranspiration is often not optimal because of less effective groundwater extraction through the tree root system; (3) plants with a forced deep roots system for groundwater treatment are often instable and unhealthy and therefore susceptible to disease and (4);

the large (aerial) footprint above the contaminated groundwater undergoing remediation could make implementation difficult because of other surface land uses and/or limitation of property accessibility.

Furthermore, some site characteristics preclude the use of a phytoremediation approach. For example, currently used phytoremediation techniques may be inappropriate for sites with concentrated, phytotoxic contaminants and for sites with contaminants present at depths beyond the reach of natural plant (tree) roots. The time-frame of phytoremediation tends to be longer than traditional cleanup technologies; therefore, requirements to sample and analyze plant tissue, plant characteristics, and environmental media (soil, groundwater, etc.) over that extended time-frame can result in significant O&M costs. In some cases, risk analysis may be required to evaluate the migration pathways such as the way harvested plant material that may contain contaminant residuals are handled. In addition, the aerial footprint required to implement phytoremediation can be much greater than that of traditional technologies.

A need exists in the art for a system and method for single extraction and treatment of a myriad of COCs. The method should leave the landscape relatively unscathed with perhaps treatment occurring at a location remote from the extraction point. The invented phytoremediation approach should not have a surface water discharge. (Surface water discharges typical with ex situ treatment approach require periodic monitoring via a National Pollutant Discharge Elimination System (NPDES) permit.) Ideally, other than conventional groundwater monitoring, no monitoring would be required for the instant method and system. Secondary waste streams should be minimized or even completely eliminated.

SUMMARY OF INVENTION

An object of the invention is to provide a system and method for optimizing soil and groundwater contamination remediation that overcomes many of the drawbacks of the prior art, wherein the invention augments phytoremediation processes by utilizing vegetation root systems as subsurface treatment cell systems. Some detox may also occur above ground, for example in leaves, flowers and branches/stems.

Another object of the invention is to provide a system and method for efficiently decontaminating/remediating soil and groundwater. A feature of the invention is irrigating a rhizosphere only with contaminated water. Contaminated water that is not otherwise accessible to plant species is extracted from below ground surface at any depth beyond the reach of plant roots. An advantage of the invention is the minimization of secondary waste streams.

Still another object of the invention is to provide a system and method for decontaminating aquifers. A feature of the invention is transporting water from impacted aquifers to a rhizosphere which may or may not be remote from the aquifer. An advantage of the invention is that ground cover or anthropomorphic infrastructure directly above the impacted aquifers need not be disturbed, but rather, phytoremediation may occur at a designated location not directly overlying the subsurface contamination. Another advantage is that aquifers at any depth below the surface may be decontaminated.

Yet another object of the present invention is to provide a method and a system for using contaminated groundwater as a source of irrigation. A feature of the invention is that an irrigation controller customizes the amount of groundwater extracted and treated to the biomass and species of vegetation used in remediation. (The controller may be monitored and programmed via hardwire, optical signals with hand held devices, or remotely via cloud computing.) An advantage of the invention is that it prevents the contaminated water from emanating from the phytocomponent as a secondary waste stream and yet maximize the amount of ground water extracted and treated.

Another object of the present invention is to provide a method and system for enhancing plant growth to maximize water treatment capacity. A feature of the invention is that an irrigation controller delivers an amount of water to optimize a plant's evapotranspiration rate, wherein the controller is guided by data inputs related to environmental variables and plant responses. In an embodiment of the invention, the system delivers a water amount in response to weather condition, soil moisture in the rhizosphere and plant condition as determined by sensors performing measurements during prescribed time intervals. An optimized water delivery rate is as much water as the species could evapotranspire and still flourish. An advantage of the invention is that it overcomes limitations of the natural growth (due to weather variation) and optimizes plant growth for maximal treatment capacity.

Briefly, the invention provides a method for treating chemicals in plant species in part in a non-ambient atmosphere, which is to say an area not in contact with the open air or ambient atmosphere, the system comprising contacting the chemicals with a rhizosphere at a flow volume and for a period of time to maximize transpiration rate and minimize over-saturation of the rhizosphere. Other plant portions above ground are in the ambient atmosphere and do process/tree the contaminants. As discussed infra, flow volume and time are related to three sub-groups:

Remediation goal, plume size, water yield, radius of influence (ROI), and number of pore volume replacement;

Local weather conditions; and

Plant species, evapotranspiration capacity, and number of plants.

A salient feature of the invented method is that the chemicals contact a vegetation's root system but without contacting the ambient or open atmosphere in which plant portions such as leaves, blades, flowers, fronds, stipes, etc., of the vegetation reside. As such, the rhizosphere of the vegetation is not in contact with ambient atmosphere such that it is located underground. The invention therefore prevents physical exposure of untreated contaminated water to ambient light, humidity, temperature, wind, erosion, human and animal activity and other characteristics which define the above ground atmosphere and environment. Notwithstanding the foregoing, some chemical detoxification may occur within the plant portion that is above ground.

The invention also provides a method for using contaminated water located in an underground layer as a source of irrigation, the method comprising extracting the contaminated water, pumping the extracted water to a plurality of irrigation zones under the control of an autonomous irrigation system, wherein each zone comprises a plurality of trees and wherein a root system for each tree is modified to function as a confined treatment cell.

Also provided is a system for treating contaminated groundwater, the system comprising a contaminated water source situated below ground surface; a means for extracting contaminated water from the contaminated groundwater bearing zone (or aquifer) and preventing the contaminated water from directly contacting the atmosphere above the ground surface; vegetation and its root system defining an underground rhizosphere, wherein the rhizosphere is adapted to directly receive the water; and a contaminant-specific treatment layer beneath the rhizosphere to treat any downward migrating irrigation water not treated by the rhizosphere. The contaminant specific treatment material may be positioned at the edge of the root treatment cell so as to be situated to the side or underneath the rhizosphere to prevent migration from the cell. Alternatively and as discussed infra, the treatment materials may be homogeneously mixed with all of the soil within the cell to enhance direct treatment. These treatment materials are designed primarily to treat any residual contamination remaining, and not to prevent migration.

BRIEF DESCRIPTION OF DRAWING

The invention together with the above and other objects and advantages will be best understood from the following detailed description of the preferred embodiment of the invention shown in the accompanying drawings, wherein:

FIG. 3 is a flowchart of the invented system and method, in accordance with features of the present invention.

DETAILED DESCRIPTION OF THE INVENTION

Figure 1:
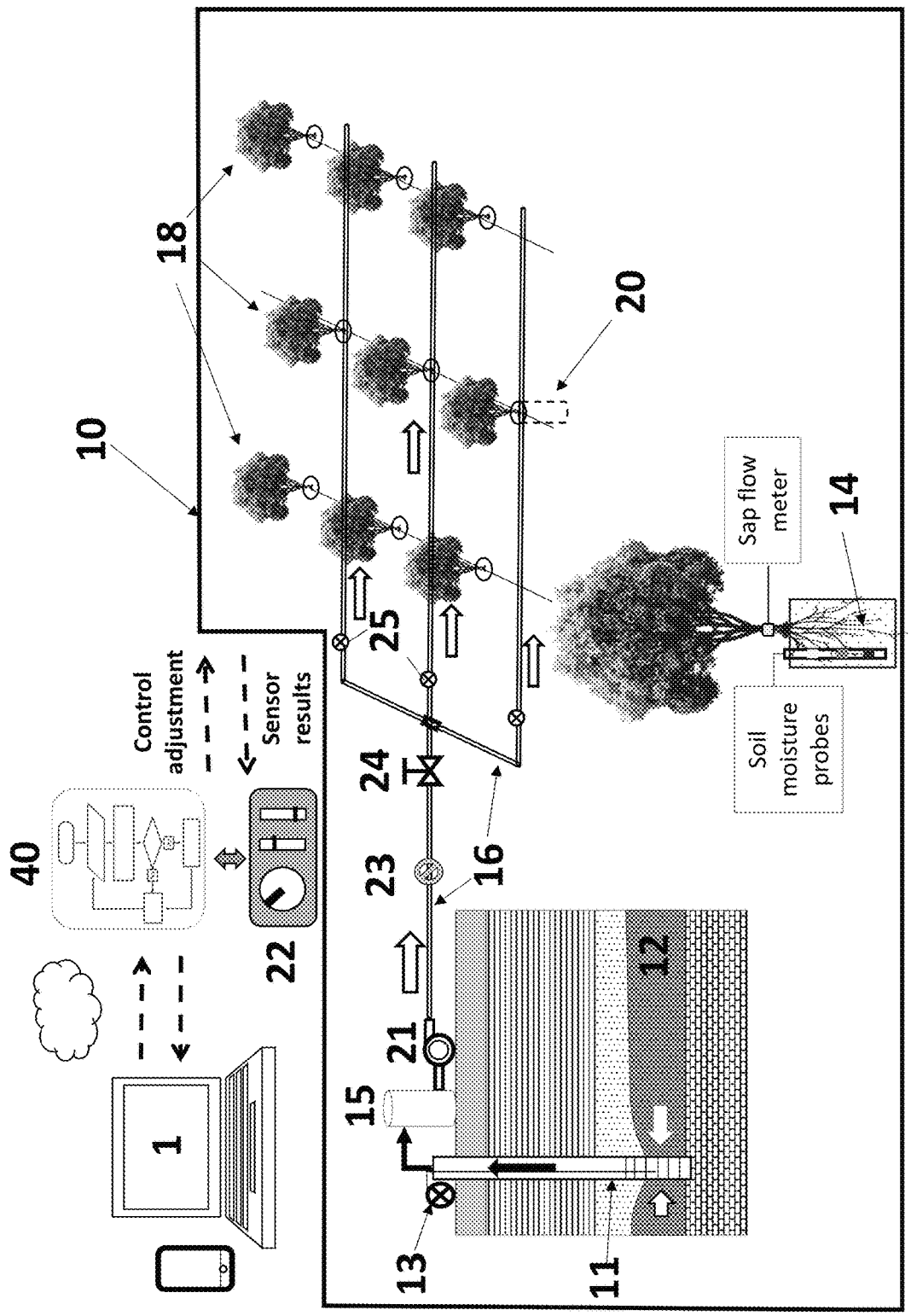
FIG. 1 is a schematic view of a hybrid phytoremediation system, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention pairs groundwater extraction with phytoremediation. The phytoremediation component replaces the ex situ water treatment unit operations (such as aeration, turbidity removal, ion exchange and reverse osmosis) which are typically used during the remediation of carbon tetrachloride contamination in waters with elevated dissolved solids. The system can also have applicability for the treatment of other contaminants present either singly or in combination. The paired groundwater extraction and phytoremediation system can be designed and operated to achieve the specific remedial action goals of a given project, e.g., achieving drinking water MCLs, the mass removal of contaminants, and the control of contaminant migration.

This "hybrid" groundwater extraction-phytoremediation approach would address contamination that under more conventional approaches would be beyond the influence of typical phytoremediation root systems alone. In this invention, the depth from which contaminated groundwater can be extracted is only limited by the design limits of the extraction pump (in terms of "head" and flow rate) and the extraction well (in terms of well depth and water yield). Limitations as to well depth are dictated by drilling technology. Typically, contaminated aquifers as shallow as 1 foot or as deep as 500 feet may be accessed. Generally, contaminated water is extracted from an aquifer or a plurality of aquifers [or water-bearing zone(s)] below ground surface.

The major components of the groundwater extraction system would include submersible pumps, force main piping, and a control box such as the Grundfos brand CU 300 controller (Brookshire, Tex.), control, monitor, and display the performance of the pumps. Either direct current electrical service powered by a solar array, or an alternating current service would be provided for each of the extraction well/water delivery control systems. A solar powered configuration could also be used.

FIG. 1 is a schematic depiction of the invented hybrid system, generally designated as numeral 10. The figure depicts trees but deep rooting grasses, bushes and other vegetation forms are also suitable. The arrows in FIG. 1 depicts the general flow of contaminated water from its original reservoir (e.g., underground aquifer) and to the vegetation grove(s).

Contaminated groundwater 12 be introduced into the rhizosphere 14 within the confined root cell of each of the trees by means of conventional irrigation system piping 16. The phytoremediation grove would assist in extracting contaminated groundwater through transpiration and breaking down contaminants by means of root microbial activities. The piping network 16 may be utilized in its entirety, or else cordoned off via a plurality of valves 25 when pump volume is variable.

The species and number of trees 18 for the phytoremediation system are determined based on the climate conditions of the area hosting the phytoremediation grove, the transpiration rate of tree species, the maximum volume of contaminated water the trees can accommodate, and the extraction rate of the contaminated water required to be treated. Contaminated water removal rates of between 5 gallons and 20 gallons per day per tree are typical. In as much as volatile organic compounds (VOC, e.g. carbon tetrachloride) are more volatile than water, if 5-20 gallon of water is evaporated though plants (from stem to leaf), all VOCs in water evaporates or otherwise volatilizes. Non-volatile compounds, are concomitantly treated through phytosequestration and/or rhizodegradation as discussed supra. They also may be mineralized through plant metabolic activities in the transpiration stream after uptake.

Contaminated water within the pore spaces of the aquifer is removed by the pumping system and then treated by the phytoremediation system at the surface. Peripheral groundwater would flow in to replace that removed water; however, with sufficient pore volume exchange, the aquifer is cleansed.

Preferred pump rate (which is the amount of water from an individual extraction well which can be moved per specific time unit) will be empirically determined, based on the size of the contaminant plume to be reduced, and water yield as noted below.

Generally, the flow volume and time may be based on data points selected from the group consisting of weather conditions, soil moisture, sap flow rates, plume size, plume reduction time windows, water yield from contaminated water-bearing zone and combinations thereof. If soil materials in the water-bearing zone are very tight, water yield is low. The total flow volume may not, change. But, the time of inflow will be longer, and vice versa.

Flow volume can be construed as the total extraction rate, which could be the sum of all pump rates, over a period determined for treatment. It is determined based on what is known as the radius of influence relative to the size of the contaminant plume, (i.e., the volume of contaminated groundwater bearing layer to be flushed through), and the number of pore volume replacements to occur within a plausible timeframe. Remediation site operators estimate the plume size of the contaminant and install an extraction well or a plurality of extraction wells with a suction power to flush the pore volume of the groundwater-bearing layer matrix for a number of times, and within a predetermined period of time, say 10 years. Once the flow rate is known, the operators may then calculate the number and type of vegetation to comprise the grove.

EXAMPLE

Based on the monitoring data from an existing phytoremediation site, the inventors found that the transpiration rate from a normal precipitation year to a wet year increased by 20 percent for Eastern cottonwood and 68 percent for Niobe Weeping Willow. These increases are particularly relevant for future sites located within the same climate region.

It is expected that an optimal water feeding rate to the root cell of each tree in the phytoremediation system can be reached using an automatically controlled irrigation system (40 as described in FIG. 3) with a solar-powered weather station and soil moisture sensor (the latter for example being a variable resistor) placed in the root cell.

In general, herbaceous species such as grasses and forbes have rooting depths between 1 and 2 ft. Prairie grasses can achieve depths of 10 to 15 ft. Trees also can achieve depths of 10 to 25 ft if special planting practices are used. Preferably, the invention is applied in terrestrial situations, wherein natural accumulations of water (lakes, streams, rivers, etc.) are not immediately proximal to the treatment venue. However, in some treatment scenarios, algae and aquatic plants are a suitable vegetation choice. In such instances, contaminated water pumped to surface impoundments may be contacted with the aquatic species via aerators situated beneath the water surface so as to prevent direct contact of the contaminated water with the atmosphere above the water surface. The contaminated water is applied to the aquatic species from beneath the water surface but without contacting the atmosphere in which the fronds, blades, gas bladders and flowers etc. of the aquatic plants reside.

Trees commonly used to remediate contamination are listed in Table 1, infra.

TABLE 1

Tree species or types used to remediate groundwater contamination

| | | |
|---|---|---|
| Apple | English oak | Native willow |
| Ash | Eucalyptus | Niobe Weeping Willow |
| Bald cypress | European ash | Norway maple |
| Black alder | Hardwoods | Peach |
| Black Hills spruce | Hybrid poplars | Pin oak |
| Black willow | Hybrid Poplar | Swamp white oak |
| Conifers | (clone 184-411) | Poplar |
| Cottonwoods | Hybrid Poplar | River birch |
| Coyote Willow | (clone OP-367) | Russian olive |
| Eastern redbud | Laurel Leaf Willow | Saltcedar |
| Cedar | Live Oak | Silver maple |
| Pine | Loblolly Pine | Siouxland Poplar |
| Eastern white pine | Magnolia | Sweetgum |
| Elm | Maples | |
| | Narrowleaf Willow | |
| | Native cottonwood | |

Although herbaceous species can be used, trees are more often relied on to address groundwater contamination. Trees are favored because their rooting depths and water (uptake) requirements (5 to 20 gallons/tree/day) allow for the treatment of significant amounts of contaminated groundwater, especially if trees are planted in large groves.

Dissolved halogenated VOCs, for example, can be degraded via microbial metabolism in the rhizosphere or root zone of trees, mineralized through plant metabolic activities in the transpiration stream after uptake, or removed through rapid dispersion from plants into the atmosphere. (Generally, microbial activities are in direct proportion to the input of water and contaminants. The feed of contaminated groundwater directly to the root cell will increase the microbial activities specific for contaminants.)

Phytoremediation can be used to treat petroleum hydrocarbons, gas condensates, crude oil, chlorinated compounds, pesticides, per- and polyfluoroalkyl substances (PFAS), and explosive compounds, as well as inorganic contaminants including salts (salinity), heavy metals, metalloids, and radioactive materials (ITRC 2009). Sites have used phytoremediation to address complex COC mixtures involving constituents with a disparate chemical make-up (e.g., organic and inorganic constituents, or volatile and non-volatile constituents).

A phytoremediation grove might consist of any number of trees preferably with the mix of tree species based upon the treatment capacity of the tree-type as determined by subject matter experts (SMEs) and design specifications. (Monospecific groves are more susceptible to disease.) Trees may be planted in rows to optimize the space available. But the trees may also be planted in concentric circles, for example atop earth mounds, or in long lines, for example along road ways. This, to accentuate the topography or utilize any available space. Trees may be planted according to a conceptual design planting configuration, such as that shown in FIG. 1.

Confined Treatment Cell Detail

Trees would be planted in a root cell planting hole 20, having predetermined measurements. In many instances, no casing would be required. The planting hole would be created using routine planting techniques. For example, an open hole created by digging equipment such as an auger or shovel. Alternatively, a biodegradable liner may be utilized during initial site development, with the proviso that the liner degrades away to allow the root system to extend beyond the initial boundary defined by the biodegradable liner. A salient feature of the invention is that the planting hole is designed to assure maximum root processing of targeted contaminates while simultaneously assuring that the health of the tree is optimized. Too shallow a planting hole and the tree may fall over. Too deep a planting hole and the roots may rot such that the tree may also fall over due to no natural, lateral bracing, or inadequate artificial lateral bracing. In light of the foregoing, the depth of the planting hole may range from 1 foot to 10 feet, and preferably from about 2-6 feet. The diameter of the bore hole may range from 10 inches to 60 inches, and preferably 24 to 48 inches. The trees may be planted with a mix of soil amendments including up to one foot of backfill and between approximately 1 to 4 ft of organic rich soil.

The invention further provides a means for preventing ambient water from contacting the rhizosphere. For example, the ground surface may be textured (such as furrowed) to divert rainfall away from each tree. Or a skirt 30 (FIG. 2) may be formed about the base of each tree so as to minimize rain fall or surface water from being absorbed by the root system. The skirt may be positioned such that its depending rim is at least overhanging the lip of the cell 20, or perhaps extending as far out as the tree's drip-line to circumscribe same. These means for routing rainfall away from the rhizosphere may be reversibly applied to allow for such uncontaminated meteoric water to be collected in surface impoundments to be supplied to the vegetation during drought conditions or when the pumps need to be taken out of service for maintenance, replacement, or decommissioning of the grove, generally.

Ultimately, these diversions prevent water other than the pumped contaminated water, from contacting the rhizosphere. As such, the root cell defines a confined controlled reaction chamber or space in which the contaminated water may interact with the rhizosphere.

Furthermore, contaminant-specific degradation compounds may be added to the soil/planting hole (preferably the bottom of the hole) to establish a treatment "cell." The treatment cell could be biotic or abiotic. In one embodiment, a fail-safe bottom layer of the tree planting hole is produced, either during or before the planting operation (14a in FIG. 2) or by placement of an injection tube 17 within, external from, or otherwise adjacent to the planting hole (20, FIG. 2) to allow solutions to be injected into the bottom most layer of the root treatment cell (14b, FIG. 2). The tube 17 (which preferably is not perforated or water permeable (e.g. solid) along its length so as to prevent fluid communication between its exterior and interior surfaces) is shown with a vertical component with a first ingress end breaching the ground surface and a second end in fluid communication with a second tube 19 generally horizontally disposed (to disperse fluids such as solutions) and situated proximal to the bottom of the planting hole, and beneath the root system. This second tube 9 is perforated or otherwise water permeable to allow fluid exchange between its exterior and interior. As such, the second tube 19 may define a screen or diffuser. Alternatively, the compounds may be homogeneously mixed with all of the soil, or preferably homogeneously mixed with soil residing in the bottom half of the planting hole.

The addition of these compounds will enhance the rhizosphere's characteristics as a treatment "cell". As such, the confined cell (which may be described as a reactive bed) can be made a "more" reactive bed by the addition of chemical additives or bioaugmentation culture additives which introduce beneficial microorganisms to a site. Such additives are commercially available, including KB 1 from SiREM, (Guelph, Ontario) for example, or hydrogen release compound HRC, available from Regenesis (San Clemente, Calif.).

Such additives may be used for different classes of contaminants, some of the contaminant classes already listed, including benzene, xylene, toluene, PFAS, and PFOAs. For example, a layer of HRC, bentonite, ion exchange media, or other sequestrant or chelating agent may be placed at the bottom of each planting to confine the contaminants and ensure that anything that gets past the tree roots will be treated, sequestered or otherwise detoxified by the confined reactive bed.

Generally, the types of contaminants the invention remediates are compounds selected from the group consisting of petroleum hydrocarbons, gas condensates, crude oil, chlorinated compounds, pesticides, per- and polyfluoroalkyl substance (PFAS) and explosive compounds, as well as inorganic contaminants including salts (salinity), heavy metals, metalloids, radioactive materials and combinations thereof.

Plumbing Detail

Dimensions and construction design of the extraction wells would be site specific. Typical extraction wells 11 (FIG. 1) may be constructed of 6 inch diameter schedule 80 polyvinyl chloride with a 10 foot, #10 slot high-flow stainless steel screen positioned at the depth from which contaminated groundwater is to be extracted. This detail is illustrative only.

Well depths and screen intervals are designed to intercept a portion of contaminated groundwater in groundwater-bearing zones. The wells may be finished with a cover having a diameter to safely overlay the mouth of the well, and a lock to prevent unauthorized access. Electrical service from an existing electric power source would be dropped to each of the extraction wells. Alternatively, or in combination, solar powered extraction pumps would be installed at each of the extraction wells, particularly in remote off-grid areas.

Influent/effluent pipe transects would be excavated. A standard dimension ratio HDPE 2-in. pipe or similar may be installed from the extraction wells to the downstream systems.

Contaminated water is extracted from the underground plume 12 (FIG. 1) via a pump 13. Depending on the depth of the plume, and its size, pump capacities of between 1 gpm and 100 gpm would suffice. Commercial manufacturers of such pumps include Grundfos RediFlo 3 (Bjerringbro, Denmark) and Dayton Water Systems (West Carrollton, Ohio). Electric service/communication cable would be installed in the extraction wells. Force main and communication cables would be routed through pitless adaptors and the pipe trench to the downstream treatment systems.

A holding tank 15 positioned between the pump and the vegetation may or may not be required, depending on the irrigation needs of the grove and or the rate in which the plume needs to be reduced. Furthermore, if groundwater is extracted from aquifers with different contaminant and dissolved solids content, a holding tank serves to provide flow and water quality equalization. Groundwater from multiple aquifers, for example could be pumped at different rates and then mixed in a single tank to ensure that irrigation water remains suitable for tree growth and suitable for treatment in the phytoremediation grove. In addition, with reference to the additives noted above, a holding tank can also be used to mix additives into extracted groundwater to augment plant growth and contaminant treatment.

The force main from each extraction well may be routed through pitless adaptors and pipe trenches to irrigation header pipe(s) positioned between rows of trees, the flow through which may be regulated by line control valves 25. A main control valve 24 may be positioned upstream from the line control valves 25. And upstream from the main control valve may be situated a flow monitor 23.

A myriad of pressures can be utilized to operate the irrigation system, as long as the objective of transporting the contaminants to the rhizosphere is achieved. Typical pressures (e.g., between 10 and 80, and preferably 30 and 50 psi) can be derived from the extraction well pumps 13 and/or from a booster tank with a pump 21 placed between the flow equalization tank and the irrigation system. The design of a given phytoremediation grove would be dependent on remedial action goals and would be influenced by pounds per square inch and flow rate (gpm) requirements and the number of sprinklers/trees couplets of the design. Irrigation for the hybrid phytoremediation system could be regulated by either a manual or automatic irrigation controller. This conceptual design assumes that the more sophisticated automatic irrigation controller would be used to regulate the distribution of contaminated groundwater to the phytoremediation grove.

Operating System, Data Processing Detail

A myriad of conventional operating systems can be adapted for reporting data from the various sensors utilized with the invention. In addition, an operating system 40 (FIG. 1), which includes a suitable, open source system such as Waggle™, available through Argonne National Laboratories, Lemont, Ill., can be used in conjunction with conventional off the shelf sensor monitoring CPUs or controller 22. Waggle™ is a platform which hosts sensors and a computational device. The current sensors on Waggle™ allow for image-, humidity-, pressure-, temperature-detector sensor readings to be built into a typical standard board. Such a standard board provides feedback to the irrigation controller to turn water flows on and off, or adjust to increase or decrease amounts of water. As such Waggle™ may be combined with baseline conventional boards which provide baseline values, such values including temperature, wind speed, insolation, and rainfall amounts, among other data points.

The sensor inputs that Waggle uses also include the water level in the well or wells (if flows are mixed in the equalization tank 15), soil moisture data, sap flow data or anything from any other sensor that may be monitored.

Waggle includes a device with CPU chips that process sensor data within the device (edge computing), which is remote from the cloud data storage and retrieval system. It also enables the forwarding of operational commands to operate valves or adjust pumps to deliver the desired amount of water and perform sensor data analysis with open source codes. It can be modified for performing site specific operations. Its open source code is available through the above laboratory location, and also at https://github.com/waggle-sensor.

In an embodiment of the invention, the CPU of the irrigation system is an irrigation controller 22, such as the WeatherTRACK ET Pro3 commercially available from HydroPoint Data Systems (Petaluma, Calif.). Suitable controllers can control a greater number of separate irrigation zones; adjust irrigation flows based on weather changes such as temperature, and rainfall; and record real time feedback (e.g. sensor results, FIG. 1) from rain sensors and moisture sensors. For example, an automatic irrigation controller can be set to automatically shut down irrigation (e.g., control adjustment, FIG. 1) if rainfall is detected or soil moisture as detected by a soil moisture probe positioned in one or several "sentinel" tree rhizospheres throughout a given phytoremediation grove, exceeds a limit of saturation. Inasmuch as the invented system/method routes rainfall away from the rhizospheres, that data point may be irrelevant.

In addition, some controllers allow for multiple run/soak cycles with shorter watering periods. Shorter run/soak cycles will preclude the inadvertent escape of groundwater from the root treatment zone.

For conceptual design purposes, a more sophisticated irrigation controller would be used in this hybrid phytoremediation design. In addition to providing better control for the distribution of contaminated groundwater to the phytoremediation grove, these controllers can be interrogated through WiFi or cell phone links or communicated with Waggle™ that is linked to the cloud server for data storage and retrieval. Thus, information on the amount of water extracted and distributed can be obtained for reporting purposes via online interface or mobile phone app 1 (FIG. 1). The invented operation criteria and sensor data analysis procedures or methods can also be rolled out via the online interface or mobile phone app 1 to update the operating system managed by the remote Waggle™ platform.

An irrigation controller, such as a HydroPoint Weather-Trak or Rainbird (www.rainbird.com) irrigation controllers or similar, is installed and configured to control multiple irrigation valve zones. Each irrigation zone might consist of seven to 10 trees, for example. The water line and low voltage control wires "downstream" from the irrigation controller is installed in trenches adjacent to the phytoremediation grove. The irrigation controller measures flow rate, and total flow, as required by groundwater withdrawal regulations.

Extracted groundwater would be pumped into the delivery header pipe as dictated by water level sensor controls in the extraction well. From the header pipe, the irrigation controller would optimize flows to irrigation valves in each zone to provide luxuriant, maximum water required for evapotranspiration of the trees during the growing season. The flow from the irrigation header pipe would be directed into the rhizosphere within the root treatment cell of each of the trees in the phytoremediation grove automatically via properly sized sprinklers such as spot emitters.

A myriad of sensors is envisioned, including water level monitors in extraction wells, flow monitors, weather gages or stations, soil moisture probes in tree root cells, and sap flow sensors. These sensors are commercially available. For example, water flow and level sensors are available from Edaphic Scientific, (Moorabbin, VIC, Australia). Dynamax, Inc. (Houston, Tex.) provides sap flow sensors/monitors.

Figure 2:
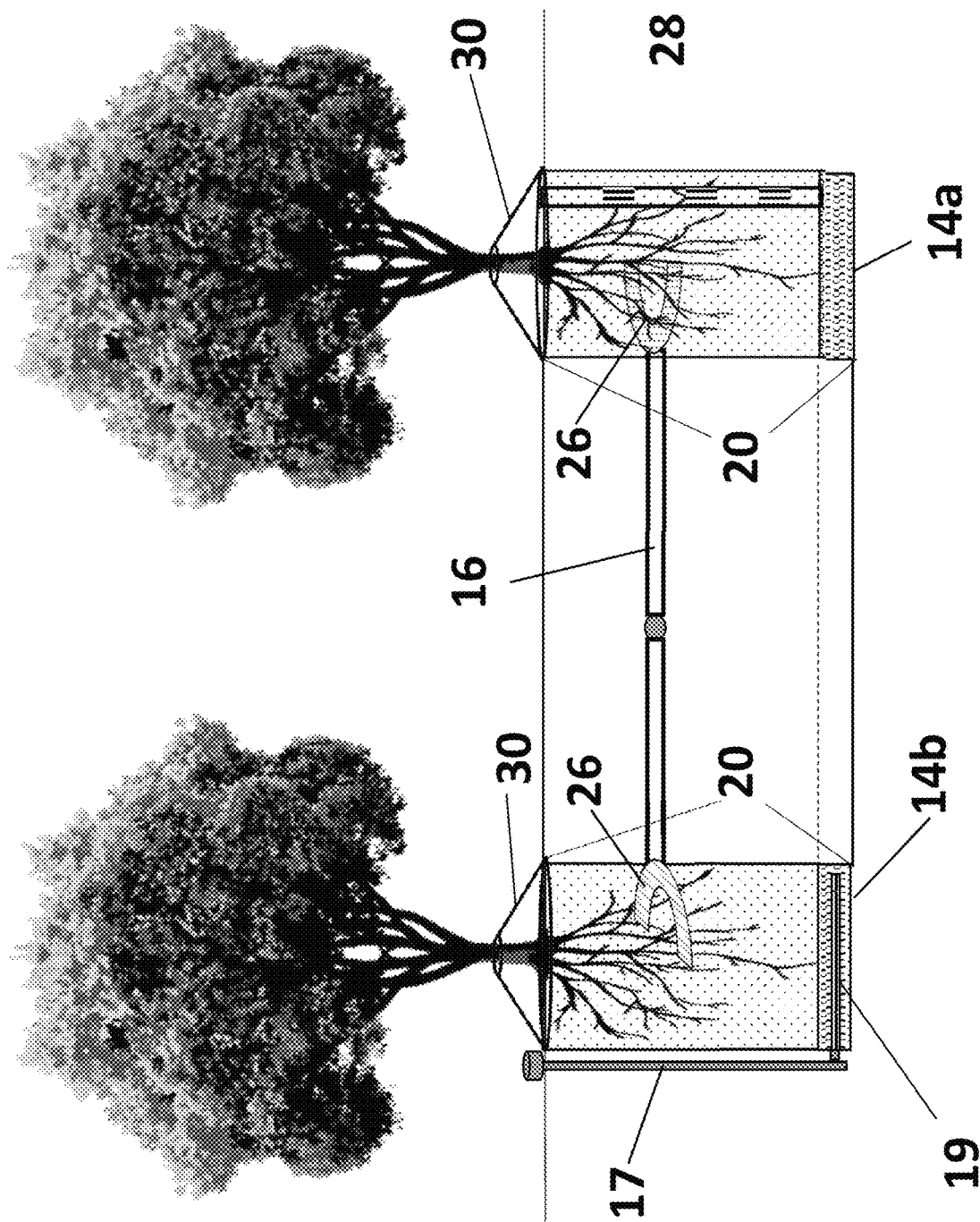
FIG. 2 is a schematic view of a tree and its root treatment cell, in accordance with features of the present invention.

FIG. 2 is a schematic diagram showing the underground spray heads 26 to facilitate direct underground dispersion of contaminated water to the root system. The spray heads 26 are shown situated at upper or middle depth, within the root cell (or planting hole) 20. As such, the spray heads 26 may be positioned approximately 1 foot below the ground surface and approximately 4 feet above the bottom of the planting hole 20. (Thus, the planting hole is depicted as 5 feet deep, and 36 inches in diameter.) Different planting depths, spray head placement etc. can be used depending on site characteristics such as soil conditions, freeze protection requirements for water lines and plant species needs. The spray heads 26 are shown configured in semicircular shapes so as to at least partially surround the periphery of the rhizosphere. However, other configurations are also appropriate, and may include a shower head design wherein the water diffuser is positioned near the top of the cell pointed down toward the root system The plumbing system releases, diffuses and otherwise applies water underground directly to the trees' roots on an as-needed basis as dictated by the delivery controller during the growing season (about 245 days/year and vary depending on the climate region of the site location) or year-round in the case of evergreen species proposed for the case study site. A plurality of sensors 28 are situated within the planting hole 20 at different radii from the center of the root well, and at different heights within the root well.

The aforementioned myriad of valves and sensors and other structures optimizes the capabilities of the invented method and system. For example, when flow rates from the extraction well to the grove are below normal, zone valves 25 may be actuated to close off one or a plurality of tiers. Or, the rain caps 30 may be reversibly removed to supplement fluid volume with surface water or provide rain water in selected root cells. Also, the valves 25 may be selectively actuated or turned off as a means to isolate or place on line certain plant species.

In summary, a hybrid phytoremediation system is provided. Nitrate is used as an exemplar co-contaminant in the mixture since nitrate contamination is widespread in the United States and since nitrates are difficult and expensive to treat.

This hybrid active/passive phytoremediation approach uses contaminated groundwater as a source of irrigation water for a phytoremediation system, such as a phytoremediation grove. Unlike the situation with conventional phytoremediation systems, the phytoremediation grove would not have to be planted immediately above contaminated groundwater.

Groundwater would be extracted using conventional well installation and groundwater extraction methods. Groundwater would then be pumped at a rate recommended by an automatic operating system, e.g. Waggle computing platform, which is communicated with an automatic irrigation controller that regulates the flow of water to multiple irrigation zones established in a desired location. Each zone would consist of a number of trees. The root system for each tree would be modified to function as a confined treatment cell that facilitates (a) contaminated water uptake to support transpiration and degradation through plant tissues, (b) microbial activities to breakdown the remaining contaminants within the root cell, and c) a fail-safe bottom-most layer of biotic or abiotic treatment to treat any downward migrating contaminants not captured and treated by the tree rhizosphere. Extracted groundwater could be provided to each of the root treatment cells in the phytoremediation system directly during the growing season (for woody annuals) or year-round (for evergreen species) via subsurface irrigation.

FIG. 3 is a flowchart 40 depicting the invention in operation. The operating system(s) (which may include a typical baseline system and specified system such as Waggle™, discussed supra) is initiated in a start sequence 42. Sensor input begins 44, those sensors including those on the standard board or other sensors communicating with Waggle or the controller. The results of the sensor data are used to compute optimal evapotranspiration based on a set of parameters and criteria 46 and the sensor data related to the current water irrigation and plant responses will be compared to the computed optimal evapotranspiration. If the current plant water use is the same as the optimal transpiration, no action 48 is taken. Rather, a predetermined time is allowed to lapse 49, and the sensor data is retaken 44.

However, if the sensor data indicates low soil moisture, or burgeoning contaminant water volume, etc., action is taken 50, such that the system/process is initiated 52 to adjust water delivery accordingly.

The system will continue to operate for a predetermined time interval 49. Then again, sensor data will be collected 44 for evaluation 46 to judge if the current plant water use meet the optimal phytoremediation capacity. If optimal conditions are attained, the system operation remains same for another predetermined time interval 49. If not, the system will be adjusted by increasing or decreasing water amount accordingly based on objective functions featured in the evaluation formulation 46.

FIG. 3 is depicted such that human intervention is not a factor in starting or stopping the system/process, such that the system may be monitored remotely. However, human or manual input may be built into the system, and such may be desired if onsite personnel are present and/or when maintenance is required.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope.

While the dimensions and types of materials and vegetation described herein are intended to define the parameters of the invention, they are by no means limiting, but are instead exemplary embodiments. For example the remediation system and method disclosed herein is controlled by parameters measured by sensors as frequently as the site-specific measurement time interval selected based on variables such as evapotranspiration (as determined by precipitation, temperature, solar radiation, humidity and wind speed), soil moisture in root cells, sap flow rates for each plant species, and groundwater level in each extraction wells. As such, time intervals correlate to the time expended between measurements taken by the sensors utilized. So, for example, based upon results at each end (e.g. $t_1$ and $t_2$).

The climate variables and soil conditions are changing within a day. The water delivery may need to be adjusted according to those changes in climate variables, soil condition, and plant's responses. For example, in the early morning, the environment may be characterized as low temperature, foggy (high humidity), low solar radiation, no wind. As such, water inflow would be reduced inasmuch as the plant has very low transpiration ability. A few hours later, with more sunshine and less fog, high solar radiation, all determined by sensors, water delivery may be increased.

In summary of this point, the invented system and method adjust water delivery amount based on the measurements at either pre-determined time interval (e.g. every 15 minutes for soil moisture; every hour for temperature, etc.) or remotely adjustable time intervals.

Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A system for treating chemicals in a contaminated water supply in a non-ambient atmosphere, the system comprising directing the chemicals to a rhizosphere situated remote from natural vegetation, such that the rhizosphere is not directly overlying the contaminated water supply, at a flow volume and for a time to increase transpiration rate, increase microbial activities, and minimize over-saturation of the rhizosphere.

2. The system as recited in claim 1 wherein the flow volume and time are based on real-time data points selected from the group consisting of weather conditions, soil moisture, sap flow rates, plume size, plume reduction time windows, water yield from contaminated water-bearing zones, and combinations thereof.

3. The system as recited in claim 1 wherein flow volume is limited to contaminant-laden water, wherein the chemicals are in the water.

4. The system as recited in claim 1 wherein the rhizosphere is not in fluid communication with surface water.

5. The system as recited in claim 1 wherein the natural vegetation is a native tree having water uptake requirements of between 5 to 20 gallons/tree/day.

6. A method for treating contaminated groundwater and using the contaminated groundwater as a source of irrigation, the method comprising:
   a) extracting the contaminated groundwater;
   b) delivering the extracted groundwater to an irrigation zone under the control of an autonomous irrigation system operating under real-time sensor feedback, wherein the zone comprises a plurality of trees and wherein a root system for each tree is modified to function as a treatment cell wherein the root system is surrounded by a biodegradable liner.

7. The method as recited in claim 6 wherein the contaminated groundwater does not flow freely above the ground.

8. The method as recited in claim 6 wherein the plurality of trees is a phytoremediation grove.

9. The method as recited in claim 6 wherein the zone is situated remote from where the contaminated groundwater is extracted so that ground cover and anthropomorphic infrastructure directly above the contaminated groundwater is not disturbed.

10. The method as recited in claim 6 wherein the contaminated groundwater is extracted from an underground aquifer beyond a reach of the root system of each tree.

11. The method as recited in claim 6 wherein the contaminated groundwater is extracted from below ground surface.

12. The method as recited in claim 6 wherein the root system is exposed only to the contaminated groundwater.

13. The method as recited in claim 6 wherein the contaminated groundwater is routed under pressure to be delivered directly into the root system.

14. A system for treating contaminated ground water, the system comprising:
   a) a contaminated water source situated below ground surface;
   b) plumbing for extracting contaminated water from the water source and preventing the contaminated water from directly contacting the atmosphere above the ground surface;
   c) vegetation having a root system defining an underground rhizosphere, wherein the rhizosphere is adapted to directly receive the water, wherein the plumbing delivers the contaminated water to the rhizosphere of the vegetation under pressure; and
   d) a contaminant-specific treatment layer proximal to the rhizosphere to treat any migrating irrigation water not treated by the rhizosphere.

15. The system as recited in claim 14 wherein the water source is not situated below the rhizosphere.

16. The system as recited in claim 14 further comprising a water diffuser proximal to the rhizosphere.

17. The system as recited in claim 14 further comprising a means for preventing ambient water from contacting the rhizosphere.

18. The system as recited in claim 14 further comprising a sensor system to measure moisture in the rhizosphere and to optimize contaminated water flow from the source to the rhizosphere in real time.

19. The system as recited in claim 18 wherein the sensor monitors sap flow, soil moisture, water level, extraction flow rate, weather conditions, and combinations thereof.

20. The system as recited in claim 18 wherein the vegetation is selected and sited based on the optimized contaminated water flow and water yield at the source of contaminated water.

21. The system as recited in claim 14 wherein the vegetation is not located proximal to, or over the source.

22. The system as recited in claim 14 wherein volatile organic carbons are volatilized through leaves of the vegetation and non volatile compounds are treated with phytosequestration and rhizodegradation.

* * * * *